(12) United States Patent
Shiraishi (10) Patent No.: US 11,207,926 B2
(45) Date of Patent: Dec. 28, 2021

(54) PNEUMATIC TIRE

(71) Applicant: The Yokohama Rubber Co., LTD., Tokyo (JP)

(72) Inventor: Takayuki Shiraishi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/753,700

(22) PCT Filed: Apr. 5, 2018

(86) PCT No.: PCT/JP2018/014575
§ 371 (c)(1),
(2) Date: Apr. 3, 2020

(87) PCT Pub. No.: WO2019/069487
PCT Pub. Date: Apr. 11, 2019

(65) Prior Publication Data
US 2020/0269636 A1    Aug. 27, 2020

(30) Foreign Application Priority Data
Oct. 4, 2017 (JP) .............................. JP2017-194267

(51) Int. Cl.
*B60C 13/00* (2006.01)
(52) U.S. Cl.
CPC ................................. *B60C 13/001* (2013.01)
(58) Field of Classification Search
CPC ..... B60C 13/00; B60C 13/001; B60C 13/002; B60C 13/003
See application file for complete search history.

(56) References Cited

U.S. PATENT DOCUMENTS

| 5,186,772 A | * | 2/1993 | Nakasaki | ................ B60C 17/00 152/516 |
| 7,153,381 B2 | * | 12/2006 | Majumdar | ............ B60C 13/001 156/116 |
| 2006/0151451 A1 | | 7/2006 | Darrow et al. | |
| 2016/0082782 A1 | | 3/2016 | Seto | |
| 2016/0239734 A1 | * | 8/2016 | Metz | ..................... B60C 13/001 |
| 2017/0011666 A1 | * | 1/2017 | Kraus | ...................... B41M 5/24 |
| 2017/0050473 A1 | | 2/2017 | Muhlhoff et al. | |
| 2017/0213117 A1 | * | 7/2017 | Kraus | ................... B60C 13/001 |

FOREIGN PATENT DOCUMENTS

| DE | 10 2008 028 780 | | 12/2009 |
| EP | 1426200 | * | 6/2004 |
| EP | 3 147 114 | | 3/2017 |

(Continued)

OTHER PUBLICATIONS

International Search Report for International Application No. PCT/JP2018/014575 dated Jun. 19, 2018, 4 pages, Japan.

*Primary Examiner* — Justin R Fischer
(74) *Attorney, Agent, or Firm* — Thorpe North & Western (57) ABSTRACT

One of sidewalls of a pneumatic tire is engraved with a two-dimensional code on a side rubber surface. The two-dimensional code is formed of a dot pattern made up of two types of gray scale elements distinguishable from each other by irregularities on the surface. The side rubber has a thickness at an engraving position of the two-dimensional code from 110 to 150% the average thickness of the entire side rubber.

17 Claims, 3 Drawing Sheets

(56) References Cited

FOREIGN PATENT DOCUMENTS

| | | | |
|---|---|---|---|
| JP | 60-187539 | * | 9/1985 |
| JP | H06-042307 | | 6/1994 |
| JP | 2003-170710 | | 6/2003 |
| JP | 3540966 | | 7/2004 |
| JP | 2009-166318 | | 7/2009 |
| JP | 2014-213717 | | 11/2014 |
| WO | WO 2005/000714 | | 1/2005 |
| WO | WO 2014/175155 | | 10/2014 |
| WO | WO 2015/118155 | | 8/2015 |
| WO | WO 2015/165863 | | 11/2015 |
| WO | WO 2016/185043 | | 11/2016 |
| WO | WO 2017/051022 | | 3/2017 |

* cited by examiner

PNEUMATIC TIRE

TECHNICAL FIELD

The present technology relates to a pneumatic tire and particularly relates to a pneumatic tire including a sidewall provided with a two-dimensional code.

BACKGROUND ART

Known tires in recent years are provided with a two-dimensional code on the sidewall of the tire. A two-dimensional code can include more information than a one-dimensional code. Thus, various information may be included in a two-dimensional code to manage a tire. In one known tire, a two-dimensional code is provided on the sidewall of the tire by engraving a pattern made up of predetermined dot holes on the sidewall (see International Patent Publication No. WO 2005/000714).

This two-dimensional code formed by engraving a pattern made up of predetermined dot holes in the sidewall remains in the sidewall as long as the tire side portions are not worn down. As a result, the tire can be effectively managed.

A pneumatic tire including a sidewall engraved with a two-dimensional code made up of a plurality of dot holes can be easily read when a tire is new. However, when load acts on the tire and the tire rolls in an outdoor environment, the two-dimensional code may become harder to read. "Read a two-dimensional code" refers to reading a two-dimensional code using a two-dimensional code reader, for example, a mobile terminal. "Harder to read" refers to when reading the two-dimensional code often fails.

Each of the dot holes is shaped to be recessed substantially vertically from the sidewall surface. Due to this shape, the holes are likely to become generation nuclei for cracks and cracks are likely to develop in the depth direction of the side rubber and also along the sidewall surface. As a result, the durability of the side rubber, and hence the durability of the pneumatic tire, may decrease.

SUMMARY

The two-dimensional code formed in the pneumatic tire is used such that information recorded in the two-dimensional code is read out when the pneumatic tire is used. As a result, a reduction in the readability of the two-dimensional code across long-term use is preferably suppressed.

The present technology provides a pneumatic tire engraved with a two-dimensional code, where a reduction of the readability of the two-dimensional code can be suppressed even when the pneumatic tire is used for a long time.

One aspect of the present technology is a pneumatic tire. The pneumatic tire includes a pair of sidewalls provided to sandwich a tread portion from both sides of the tread portion in a tire lateral direction, the tread portion extending in a tire circumferential direction and formed into an annular shape.

One of the pair of sidewalls is engraved with a two-dimensional code on a side rubber surface, where the two-dimensional code is formed of a dot pattern made up of two types of gray scale elements distinguishable from each other by irregularities on the surface. The side rubber has a thickness at an engraving position of the two-dimensional code from 110 to 150% an average thickness of an entire side rubber.

The average thickness of the side rubber in a region where the two-dimensional code is provided is preferably greater than an average thickness of the side rubber member at an edge surrounding the two-dimensional code and in contact with the two-dimensional code.

The two-dimensional code preferably includes a dot pattern region where a dot pattern made up of two types of gray scale elements is formed, and a blank region where light elements of the gray scale elements surround the dot pattern region. The average thickness of the side rubber member in the dot pattern region is preferably greater than the average thickness of the side rubber member in the blank region.

A position at which the side rubber is thickest among distribution of thickness of the side rubber in the two-dimensional code is preferably located in the dot pattern region.

The two-dimensional code is preferably a QR code® and the average thickness of the side rubber in a data cell region displaying data cells of the QR code® is preferably greater than the average thickness of the side rubber member in a position detection pattern region displaying a position detection pattern of the QR code®.

The position at which the side rubber is thickest among distribution of thickness of the side rubber in the two-dimensional code is preferably located in the data cell region.

The dot pattern region is preferably formed in a region where radius of curvature of a surface of the sidewall defined by an outermost position, an innermost position and an intermediate position is from 30 to 200 mm, the outermost position being located outermost in the tire radial direction in the dot pattern region formed of a dot pattern made up of two types of gray scale elements in the two-dimensional code, the innermost position being located innermost in the tire radial direction in the dot pattern region, and the intermediate position bisecting a region between the outermost position and the innermost position in the tire radial direction in the dot pattern region.

The pneumatic tire is preferably provided with a rim protection bar that protrudes in a ridge shape around an entire circumference of the sidewall in the tire circumferential direction, and the two-dimensional code is preferably formed, in a tire radial direction, in a region between a maximum width position of a carcass ply of the pneumatic tire in the tire lateral direction and the rim protection bar.

According to the pneumatic tire described above, it is possible to suppress a reduction in the readability of a two-dimensional code even when the pneumatic tire is used for a long time.

DETAILED DESCRIPTION

Below, a pneumatic tire according to the present embodiment will be described.

In the present specification, "tire lateral direction" is the direction parallel with the rotation axis of the pneumatic tire. "Outward in the tire lateral direction" is the direction in the tire lateral direction away from a tire equator line CL (see FIG. 1) that represents a tire equatorial plane. "Inward in the tire lateral direction" is the direction in the tire lateral direction closer to the tire equator line CL. "Tire circumferential direction" is the direction of rotation of the pneumatic tire about the center of the rotation axis. "Tire radial direction" is the direction orthogonal to the rotation axis of the pneumatic tire. "Outward in the tire radial direction" refers to the direction away from the rotation axis. Similarly, "inward in the tire radial direction" refers to the direction closer to the rotation axis.

In the present specification, a two-dimensional code refers to a matrix display type code containing information in two directions, as opposed to a one-dimensional code (barcode) that contains information only in the lateral direction. Examples of two-dimensional codes include a QR code®, a DataMatrix®, a MaxiCode, PDF-417®, a Code 16K®, a 49 Code®, an Aztec Code®, an SP Code®, a VeriCode®, and a CP Code®.

Pneumatic Tire

Figure 1:
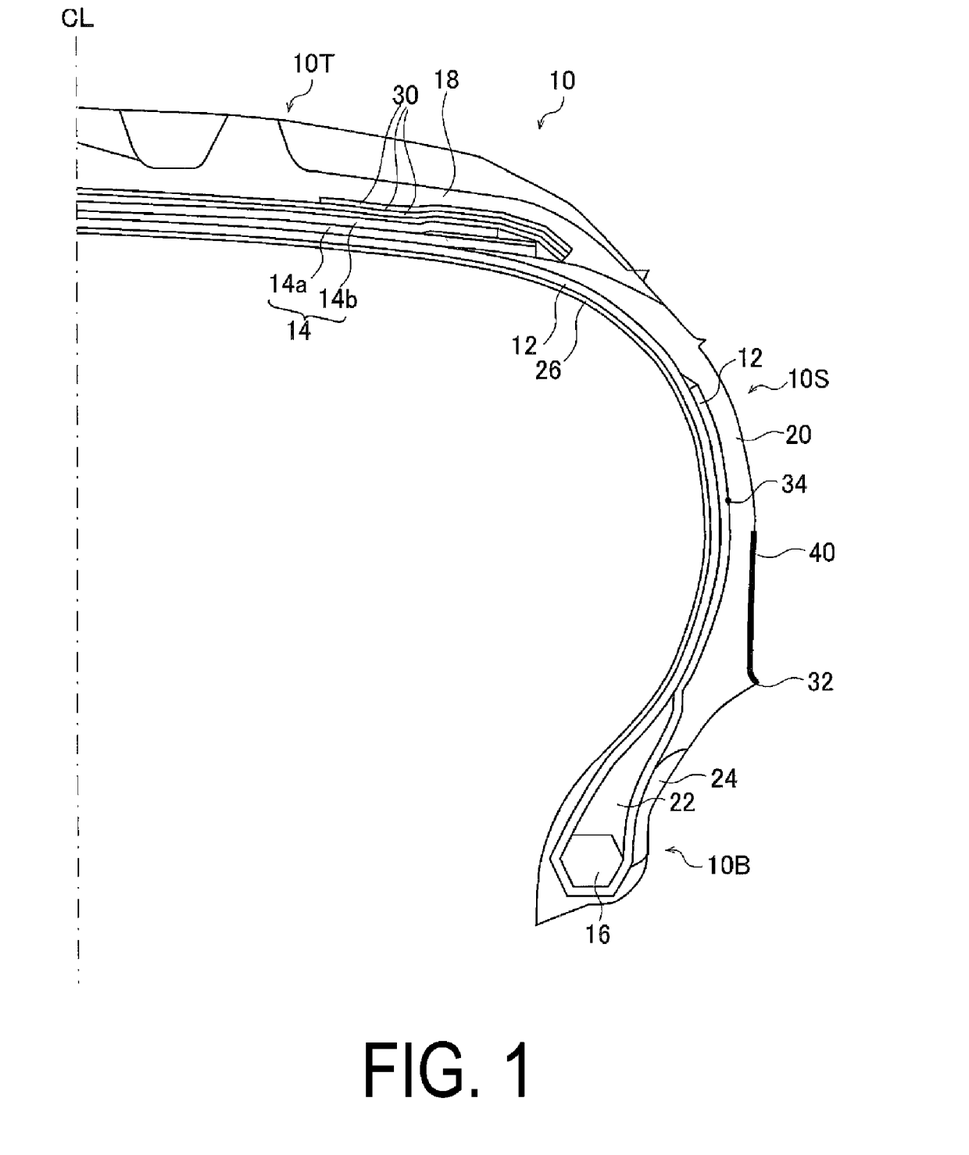
FIG. 1 is a diagram illustrating an exemplary configuration of a pneumatic tire according to one embodiment.

FIG. 1 is a diagram illustrating an exemplary configuration of a pneumatic tire 10 (hereinafter simply referred to as "tire 10") according to one embodiment. FIG. 1 illustrates a profile cross-section on one side of a tire equator line CL in the tire lateral direction.

The tire 10 includes a tread portion 10T including a tread pattern, a pair of bead portions 10B formed on both sides in the tire lateral direction, and a pair of sidewall portions 10S provided on both side of the tread portion 10T and respectively connecting each one of the pair of bead portions 10B and the tread portion 10T. The tread portion 10T is a portion that comes into contact with a road surface. The sidewall portions 10S are portions provided to sandwich the tread portion 10T from both sides of the tread portion 10T in the tire lateral direction. The bead portions 10B are portions connected to the sidewall portions 10S and located inward of the sidewall portions 10S in the tire radial direction.

The tire 10 primarily includes a carcass ply 12, a belt 14 and a bead core 16 as framework members, and a tread rubber 18, a side rubber 20, a bead filler rubber 22, a rim cushion rubber 24, and an inner liner rubber 26 disposed around the framework members.

The carcass ply 12 is formed of a carcass ply member that is made of organic fibers covered with rubber and wound between the pair of annular bead cores 16 into a toroidal shape. The carcass ply 12 is wound around the bead cores 16 and extending outward in the tire radial direction. The belt 14 is made up of two belt members 14a and 14b, and provided outward of the carcass ply 12 in the tire radial direction. The belt 14 is a member formed of steel cords covered with rubber. The steel cords are inclined at a predetermined angle, for example, from 20 to 30° with respect to the tire circumferential direction. The width of the lower belt member 14a in the tire lateral direction is greater than the width of the upper belt member 14b in the tire lateral direction. The steel cords of the two belt members 14a and 14b are inclined in opposite directions. As such, the belt members 14a and 14b are crossing layers serving to suppress expansion of the carcass ply 12 due to the pressure of the air in the tire.

The tread rubber 18 is disposed outward of the belt 14 in the tire radial direction. Both end portions of the tread rubber 18 connect to the side rubbers 20 to form the sidewall portions 10S. The rim cushion rubbers 24 are provided at the inward ends of the side rubbers 20 in the tire radial direction, and come into contact with the rim on which the tire 10 is mounted. The bead filler rubber members 22 are provided outward of the bead cores 16 in the tire radial direction sandwiched between a portion of the carcass ply 12 before the carcass ply 12 is wound around the bead cores 16 and a portion of the carcass ply 12 after the carcass ply 12 is wound around the bead cores 16. The inner liner rubber 26 is provided on the inner surface of the tire 10 facing a tire cavity region that is filled with air and is surrounded by the tire 10 and the rim.

The tire 10 also includes a three-layered belt cover 30 formed of organic fibers covered with rubber between the belt member 14b and the tread rubber 18. The belt cover 30 covers the belt 14 from outward of the belt 14 in the tire radial direction. The belt cover 30 is not required and may be provided as needed. The number of layers that make up the belt cover 30 is not limited to three, and may be one or two layers.

A two-dimensional code 40 is formed on the surface of the sidewall portion 10S of the tire 10 configured as described above. In FIG. 1, the position of the two-dimensional code 40 is indicated by a thick line.

Sidewall Portion 10S and Two-dimensional Code 40

Figure 2:
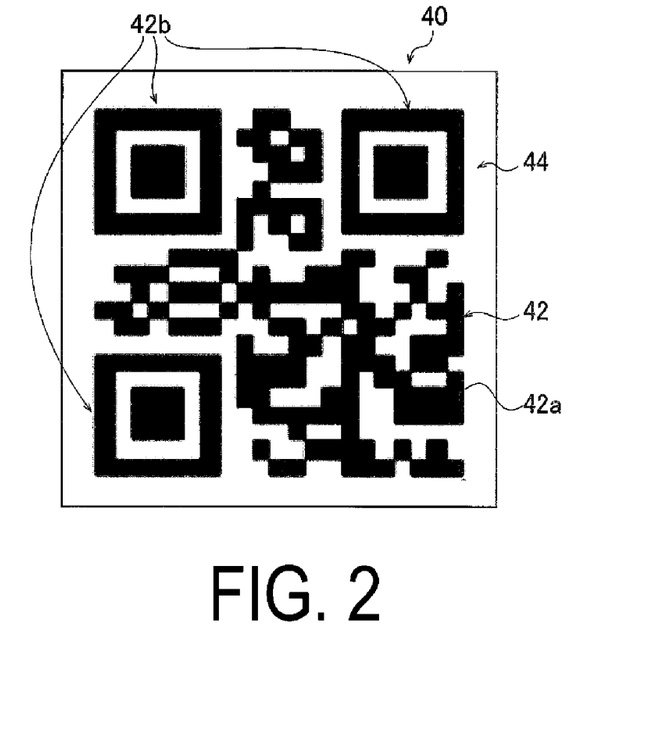
FIG. 2 is a diagram explaining an example of a two-dimensional code according to one embodiment.

FIG. 2 is a diagram explaining an example of the two-dimensional code 40 according to one embodiment provided on the surface of the sidewall portion 10S of the tire 10.

The two-dimensional code 40 is engraved on the surface of the side rubber 20 in either of the sidewall portions 10S. The two-dimensional code 40 is formed of a dot pattern made up of two types of gray scale elements distinguishable from each other by irregularities on the surface. The two-dimensional code 40 is a pattern formed by converging a laser beam and concentrating energy on the surface of the sidewall portion 10S to locally heat and burn the side rubber 20 and engrave a plurality of small dot holes on the surface. Each dot hole is, for example, a conical-shaped hole. In the tread surface, the diameter of each dot hole is, for example, from 0.1 to 1.0 mm and the depth of each hole is, for example, from 0.3 to 1.0 mm.

The two-dimensional code 40 is formed by providing one dot hole (recess portion) in a dark unit cell region of a unit cell that defines the gray scale elements that make up the two-dimensional code. No dot holes (recess portions) are provided in a light unit cell region of the unit cell. In other words, the two-dimensional code 40 has a configuration in which the dot holes (recess portions) are arranged such that each dot hole (recess portion) forms one dark unit cell region among the gray scale elements in corresponding to a plurality of rectangular unit cell regions having the same size and divided into lattice-like shapes. In FIG. 2, the dark region of the unit cell region is the region colored in black.

The two-dimensional code 40 illustrated in FIG. 2 is a QR code® including a dot pattern region 42 in which a dot pattern is formed of two types of gray scale elements, and a blank region 44 made up of light elements of the gray scale elements in which the light elements surround the dot pattern region 42 (in FIG. 2, a frame line is illustrated to clarify the outer edge of the blank region 44). The width of the blank region 44 is preferably, for example, four to five times the dimension size of the unit cell region within the dot pattern region 42. For example, the blank region 44 is preferably from 15 to 25% the width of the dot pattern region 42.

Because the two-dimensional code 40 illustrated in FIG. 2 is a QR code®, the dot pattern region 42 includes a data cell region 42a in which data cells of the QR code® are displayed, and position detection pattern regions 42b in which position detection patterns are displayed.

The two-dimensional code 40 is only provided in a region where the thickness of the side rubber 20 at each position of the two-dimensional code 40 is from 110 to 150% the average thickness of the entire side rubber 20. The thickness of the side rubber 20 is constant along the tire circumferential direction, but varies along the tire radial direction. By providing the side rubber 20 in a limited region in the tire radial direction, it is possible to suppress a decrease in the readability of the two-dimensional code 40 even when the tire 10 is used for a long period of time outdoors and exposed to ultraviolet light and oxygen atmosphere. The position at which the two-dimensional code 40 is provided is limited by the thickness of the side rubber 20. Thus, even if dot holes are continuously formed in adjacent unit cell regions in the two-dimensional code 40 and the tire 10 rolls in a loaded state, causing the dot holes to deform, the thick thickness of the side rubber 20 alleviates the deformation of the dot holes and suppresses an increase in strain around the dot holes. As a result, micro cracks are less likely to occur around the dot holes, and development of these cracks is suppressed. In a case where a thickness G1 of the side rubber 20 at the position of the two-dimensional code 40 is less than 110% of an average thickness Gave of the entire side rubber 20, the effect of the side rubber 20 alleviating the deformation of the dot holes will be small and micro cracks will easily develop in the depth direction of the dot holes. Additionally, because the side rubber 20 is thin in thickness, micro cracks are more likely to develop in the depth direction and reach the carcass ply 12, which is the tire framework member located inward of the side rubber 20. The micro cracks reaching the carcass ply 12, which is the tire framework member, is not preferable in terms of maintaining the durability of the tire 10. On the other hand, in a case where the thickness G1 at the position of the two-dimensional code 40 is greater than 150% of the average thickness Gave of the entire side rubber 20, strain on the sidewall surface caused by deformation of the dot holes when the tire rolls in a loaded state increases, and micro cracks are more likely to develop along the surface of the sidewall portion 10S. Further, the portion at which the side rubber 20 is thick generates heat and has a high local temperature. Thus, degradation of the rubber subjected to deformation at high temperature is promoted and the development of micro-cracks further increases. The development of micro-cracks may cause surface irregularities to be formed in a unit cell region provided with no dot holes and may decrease the degree of shading of the gray scale elements in the two-dimensional code 40. Thus, errors when attempting to read the two-dimensional code 40 are more likely to occur. The average thickness Gave is, for example, from 2.0 to 5.0 mm.

The thickness G1 is preferably 120% or greater than the average thickness Gave. Further, the thickness G1 is preferably 140% or less than the average thickness Gave. Here, the thickness of the side rubber 20 in the two-dimensional code 40 as well as each various average thicknesses described below refers to a thickness before the dot holes are engraved. The thickness of the side rubber 20 may be thickness of the side rubber 20 at the same position in the tire radial direction outside of the region of the two-dimensional code in the tire circumferential direction.

Figure 3:
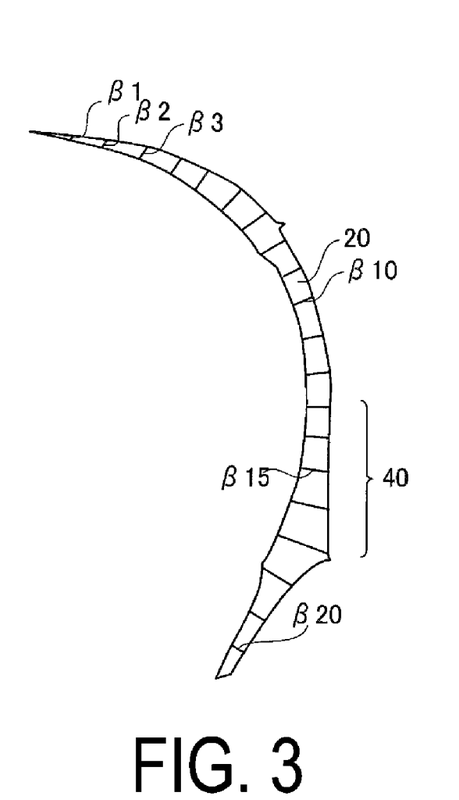
FIG. 3 is a diagram explaining a method for measuring average thickness of a side rubber.

As illustrated in FIG. 3, the average thickness Gave of the entire side rubber 20 is the average value (simple average) of each thicknesses at positions every 3 mm apart along the surface of the sidewall portion 10S from one end of the side rubber 20 in the profile cross-section of the side rubber 20. This thickness is the thickness of the side rubber 20 along a direction orthogonal to the extension direction of the carcass ply 12 adjacent to the lower layer of the side rubber 20. FIG. 3 is a diagram explaining a method for measuring the average thickness of the side rubber 20. As illustrated in FIG. 3, supposing that the thicknesses at each position 3 mm apart are thicknesses $\beta 1$ to $\beta 20$, the average thickness is $(\beta 1 + \ldots + \beta 20)/20$.

On the other hand, the thickness G1 of the side rubber 20 at the position of the two-dimensional code 40 is the thickness at each of the positions along the direction orthogonal to the extension direction of the carcass ply 12 adjacent to the lower layer of the side rubber 20.

In such a two-dimensional code 40, according to one embodiment, an average thickness G1ave of the side rubber 20 in a region where the two-dimensional code 40 is provided is preferably greater than an average thickness G2ave of a side rubber member at an edge that surrounds the two-dimensional code 40 and is in contact with the two-dimensional code 40. By making the average thickness G1ave greater than the average thickness G2ave of the side rubber member at the edge surrounding the two-dimensional code 40, the development of micro-cracks can be effectively suppressed. Thus, a reduction in the readability of the two-dimensional code 40 over long-term use of the tire 10 can be suppressed.

The average thickness G2ave is the average thickness of the side rubber 20 at the edge that surrounds the two-dimensional code 40 and is in contact with the two-dimensional code 40, specifically, the average thickness of the side rubber 20 on a line, and is the average value of the thicknesses at each position along the direction orthogonal to the direction of extension of the carcass ply 12 adjacent to the lower layer of the side rubber 20. The positions are specifically each position 3 mm interval on the above-described line.

The average thickness G2ave is preferably the average thickness of the side rubber 20 in a 10 mm band region surrounding the two-dimensional code 40, instead of the average thickness on a line that surrounds the two-dimensional code 40 and is in contact with the two-dimensional code 40. By setting the average thickness G1ave greater than the average thickness G2ave, generation and development of micro cracks can be suppressed and a decrease in readability can be further suppressed.

The average thickness G1ave of the side rubber member in the region where the two-dimensional code 40 is provided preferably includes thickness of the side rubber member in the blank region 44. The average thickness G1ave in this case is an average value (simple average) of the thickness in the direction orthogonal to the extension direction of the carcass ply 12 at each position including a starting point. These positions are measured every 3 mm from the starting point along a surface extending in the tire radial direction of the sidewall portion 10S, with one end of the two-dimensional code 40 in the tire radial direction serving as the starting point. The blank region 44 is also a portion that contributes to the readability of the two-dimensional code 40, and a loss of gradient at this portion also decreases readability. In this case, the width of the blank region 44, which is part of the region defining the average thickness G1ave, is preferably five times the dimension size of the unit cell region in the dot pattern region 42. According to one embodiment, the width dimension of the blank region 44 or 10 mm, whichever is largest, is preferably used as the width of the blank region 44.

According to one embodiment, an average thickness G3ave of the side rubber 20 in the dot pattern region 42 is preferably greater than an average thickness G4ave of the side rubber 20 in the blank region 44 in terms of suppressing reduction in readability. The average thickness G3ave and the average thickness G4ave are thicknesses defined in the same manner as the average thickness G1ave described above.

Note that, as described above, the width of the blank region 44 that defines the average thickness G4ave is a width four to five times the dimension size of the unit cell region in the dot pattern region 42. However, a band region surrounding the dot pattern region 42 and having the width dimension of the blank region 44 or 10 mm, whichever is largest, may be used instead of the blank region 44 that defines the average thickness G4ave. By setting the average thickness G3ave to be greater than the average thickness G4ave, generation and development of micro cracks can be suppressed and a decrease in readability can be further suppressed.

According to one embodiment, in a configuration where the two-dimensional code 40 is a QR code®, an average thickness G5ave of the side rubber 20 in the data cell region 42a is preferably greater than an average thickness G6ave of the side rubber 20 in the position detection pattern region 42b in which a position detection pattern is displayed. With such a configuration, a reduction in readability is suppressed. The average thickness G5ave and the average thickness G6ave are thicknesses defined in the same manner as the average thickness G1ave described above.

In this case, the position at which the side rubber 20 is thickest among distribution of the thickness of the side rubber 20 in the two-dimensional code 40 is preferably in the data cell region 42a in terms of suppressing a decrease in readability. At this time, there may also be a position in the symbol region 42b at which the side rubber 20 is thickest.

In a configuration where the two-dimensional code 40 is not a QR code®, the position at which the side rubber 20 is thickest in among the distribution of the thickness of the side rubber 20 is preferably in the dot pattern region 42 in terms of suppressing a decrease in readability.

According to one embodiment, the dot pattern region 42 is preferably formed in a region where a radius of curvature R of the surface of the sidewall portion 10S determined from an outermost position, an innermost position and an intermediate position that bisects a region between the outermost position and the innermost position in the tire radial direction in the dot pattern region 42, in other words, the radius of an arc that passes through the point of the innermost position, the point of the outermost position and the point of the intermediate position is preferably from 30 to 200 mm. In this case, the dot holes can be formed more evenly. As a result, a reduction in readability can be suppressed. An engraving device that converges a laser beam to perform engraving defines, using a camera, the region in which the two-dimensional code 40 is to be provided and determines a marking position to correspond to the unit cell region formed by separating the defined region at equal intervals. A marking position at a portion with large curvature varies in the depth direction of the irradiation direction of the laser beam. Thus, the position at which the laser beam converges likely deviates and sufficient light energy is less likely to be concentrated at the marking position. Thus, depth and diameter of the dot holes easily fluctuate. As a result, the density of the dark region fluctuates and a reduction in readability is likely to occur. Further, the shape of the dot holes varies depending on location. Thus, micro-cracks are more likely to be generated. At a portion at which curvature is large, the depth direction of the dot holes is likely to vary because the degree to which the large-curvature portion deviates from the orthogonal direction relative to the sidewall surface increases. This variation in the depth direction of the dot holes is also likely to cause micro-cracks to be generated.

On the other hand, a portion at which curvature is small is a portion where the outer surface of the side rubber 20 largely deviates from the carcass ply 12 curved at a curvature radius within a predetermined range and where the thickness of the side rubber 20 varies greatly. Such a portion at which the thickness of the side rubber 20 varies greatly is a portion where the rigidity distribution of the sidewall portion 10S fluctuates, and is not preferable to use the portion as an engraving region of the two-dimensional code, in terms of ensuring the rigidity of the sidewall portion 10S.

Due to that described above, the dot pattern region 42 is preferably formed in a region where the radius of curvature R is from 30 to 200 mm. Herein, the radius of curvature R includes both a radius of curvature protruding outward and a radius of curvature recessed inward, of the surface of the sidewall portion 10S.

As illustrated in FIG. 1, the tire 10 may include a rim protection bar 32 that protrudes in a ridge shape and is provided around the entire circumference of the sidewall portion 10S in the tire circumferential direction. With this configuration, according to one embodiment, the two-dimensional code 40 is preferably formed in a region between a maximum width position 34 of the carcass ply 12 of the tire 10 in the tire lateral direction and the rim protection bar 32 in the tire radial direction. This region includes the position at which the side rubber 20 is thickest. Thus, deflection and distortion acting on the side rubber members 20 is relatively small in this region. Accordingly, the possibility of micro-cracks generation around the dot holes is lower than in other areas. The blank region 44 is also a portion that contributes to suppressing a reduction in readability. The portion at which the side rubber 20 is thickest may be in the blank region 44.

EXAMPLE, COMPARATIVE EXAMPLE

In order to confirm the effect of the tire 10, two-dimensional codes 40, specifically QR codes®, were engraved at various locations on the sidewall portion 10S. Then, the tire 10 was run and the two dimensional codes 40 were read.

The tire 10 provided with the two-dimensional code 40 (tire size: 275/40R210 107Y) was mounted on a wheel having a rim size of 21×9.5 J. Ozone irradiation was performed on each tire 10 at an ozone concentration of 100 pphm. Then, ozone irradiation at the same concentration was performed at predetermined intervals while performing indoor drum running (speed: 120 km/hr) using a FMVSS139-compliant low pressure test (XL: air pressure at 160 kPa and load at 100% LI), and the tire 10 was run for 1.5 hours.

Five tires provided with the two-dimensional code 40 were prepared for each Example and Comparative Example, and the tests were performed.

The two dimensional codes 40 were read by a two-dimensional code reader. The two-dimensional code 40 was irradiated with a predetermined irradiation light from a predetermined direction. If the two-dimensional code 40 on all five tires was easily read, the two-dimensional code 40 was evaluated as Grade A. If the two-dimensional code 40 on one tire was read after changing the angle of the irradiation light, the tire was evaluated as Grade B. If the two-dimensional codes 40 on two tires were read after changing the angle of the irradiation light, the tire was evaluated as Grade C. If the two-dimensional codes 40 on three tires were read after changing the angle of the irradiation light, the tire was evaluated as Grade D. If the two-dimensional codes 40 on four or five tires were read after changing the angle of the irradiation light, the tire was evaluated as Grade E. If the two-dimensional code 40 on at least one of the five tires could not be read, the tire was evaluated as Grade F. Grades A to E are a pass and Grade F is a fail.

Each specification and evaluation results are shown in the table below.

The "location of the two-dimensional code" in the following table is described as "above" when the two-dimensional code 40 is located outward in the tire radial direction of the maximum width position 34 in the tire lateral direction of the carcass ply 12 and described as "below" when the two-dimensional code 40 is located inward in the tire radial direction of the maximum width position 34 and outward in the tire radial direction of the rim protection bar 32.

In the table, the "location of the maximum thickness of the side rubber 20" is described as "inside two-dimensional code" when the position of the maximum thickness of the side rubber 20 is within the region of the two-dimensional code 40 and described as "outside two-dimensional code" when the position is outside the region of the two-dimensional code 40.

Components such as G1 listed in the table are described below:

G1: Thickness of the side rubber 20 at each position of the two-dimensional code 40

Gave: Average thickness of the entire side rubber 20

G1ave: Average thickness of the side rubber 20 in the region where the two-dimensional code 40 is provided G2ave: Average thickness of the side rubber 20 at the edge surrounding the two-dimensional code 40

R: Radius of curvature of the surface of the sidewall portion 10S determined from the outermost position, the innermost position and the intermediate position in the tire radial direction in the dot pattern region 42

TABLE 1

|  | Comparative Example 1 | Comparative Example 2 | Comparative Example 3 | Comparative Example 4 | Example 1 |
|---|---|---|---|---|---|
| G1/Gave | 97 to 105% | 96 to 130% | 110 to 155% | 150 to 155% | 110 to 130% |
| Size of G2ave, G1ave | G1ave < G2ave | G1ave < G2ave | G1ave < G2ave | G1ave < G2ave | G1ave < G2ave |
| Radius of curvature R at two-dimensional code [mm] | 20 | 25 | 25 | 25 | 20 |
| Location of two-dimensional code | Above | Above | Above | Above | Above |
| Location of maximum thickness of side rubber member 20 | Outside two-dimensional code | Outside two-dimensional code | Outside two-dimensional code | Outside two-dimensional code | Outside two-dimensional code |
| Readability Evaluation | F | F | F | F | D |

TABLE 2

|  | Example 2 | Example 3 | Example 4 | Example 5 | Example 6 |
|---|---|---|---|---|---|
| G1/Gave | 115 to 135% | 130 to 150% | 110 to 150% | 115 to 140% | 110 to 135% |
| Size of G2ave, G1ave | G1ave < G2ave | G1ave < G2ave | G1ave < G2ave | G1ave > G2ave | G1ave > G2ave |
| Radius of curvature R at two-dimensional code [mm] | 25 | 25 | 25 | 25 | 30 |
| Location of two-dimensional code | Above | Above | Above | Above | Above |
| Location of maximum thickness of side rubber member 20 | Outside two-dimensional code | Outside two-dimensional code | Outside two-dimensional code | Outside two-dimensional code | Outside two-dimensional code |
| Readability Evaluation | D | D | D | C | B |

TABLE 3

|  | Example 7 | Example 8 | Example 9 | Example 10 |
|---|---|---|---|---|
| G1/Gave | 110 to 140% | 115 to 135% | 115 to 140% | 110 to 145% |
| Size of G2ave, G1ave | G1ave > G2ave | G1ave > G2ave | G1ave > G2ave | G1ave > G2ave |
| Radius of curvature R at two-dimensional code [mm] | 100 | 200 | 210 | 100 |
| Location of two-dimensional code | Below | Below | Below | Below |
| Location of maximum thickness of side rubber member 20 | Outside two-dimensional code | Outside two-dimensional code | Outside two-dimensional code | Inside two-dimensional code |
| Readability Evaluation | B | B | C | A |

Comparing Comparative Examples 1 to 4 and Examples 1 to 4, it can be seen that readability improved by setting G1/Gave to from 110 to 150%.

Furthermore, comparing Examples 2 and 5, it can be seen that readability is further improved by setting G1ave>G2ave.

It can be seen from Examples 5 to 9 that readability improved by setting the radius of curvature R from 30 to 200 mm.

By comparing Examples 7 and 10, it can be seen that when the two-dimensional code 40 is between the maximum width position 34 in the tire radial direction and the rim protection bar 32, and the position of the maximum thickness of the side rubber 20 is within the region of the two-dimensional code 40, readability is further improved.

As a result, the improved readability effect of the two-dimensional code 40 in the tire 10 is evident.

The foregoing has been a detailed description of the pneumatic tire according to an embodiment of the present technology. However, the present technology is naturally not limited to the above embodiments, but may be improved or modified in various ways within the scope of the present technology.

The invention claimed is:

1. A pneumatic tire comprising:
   a pair of sidewalls provided to sandwich a tread portion from both sides of the tread portion in a tire lateral direction, the tread portion extending in a tire circumferential direction and formed into an annular shape,
   one of the pair of sidewalls being engraved with a two-dimensional code on a side rubber surface, the two-dimensional code being formed of a dot pattern made up of two types of gray scale elements distinguishable from each other by irregularities on the surface, and
   a side rubber having a thickness at an engraving position of the two-dimensional code from 110 to 150% an average thickness of an entire side rubber, wherein
   the two-dimensional code is disposed at a region in a tire radial direction that includes a position where a tire maximum width position of the pneumatic tire is located, and
   a dot pattern region is formed in a region where radius of curvature of a surface of the sidewall defined by an outermost position, an innermost position and an intermediate position is from 30 to 200 mm, the outermost position being located outermost in the tire radial direction in the dot pattern region formed of a dot pattern made up of two types of gray scale elements in the two-dimensional code, the innermost position being located innermost in the tire radial direction in the dot pattern region, and the intermediate position bisecting a region between the outermost position and the innermost position in the tire radial direction in the dot pattern region.

2. The pneumatic tire according to claim 1, wherein the average thickness of the side rubber in a region where the two-dimensional code is provided is greater than an average thickness of the side rubber at an edge surrounding the two-dimensional code and in contact with the two-dimensional code.

3. The pneumatic tire according to claim 2, wherein the two-dimensional code includes a dot pattern region where a dot pattern made up of two types of gray scale elements is formed, and a blank region where light elements of the gray scale elements surround the dot pattern region, the average thickness of the side rubber in the dot pattern region is greater than the average thickness of the side rubber in the blank region.

4. The pneumatic tire according to claim 3, wherein a position at which the side rubber is thickest among distribution of thickness of the side rubber in the two-dimensional code is located in the dot pattern region.

5. The pneumatic tire according to claim 4, wherein:
   the two-dimensional code is a QR code®; and
   the average thickness of the side rubber in a data cell region displaying data cells of the QR code® is greater than the average thickness of the side rubber in a position detection pattern region displaying a position detection pattern of the QR code®.

6. The pneumatic tire according to claim 5, wherein the position at which the side rubber is thickest among distribution of thickness of the side rubber in the two-dimensional code is located in the data cell region.

7. The pneumatic tire according to claim 6, wherein:
   the pneumatic tire is provided with a rim protection bar that protrudes in a ridge shape around an entire circumference of the sidewall in the tire circumferential direction; and
   the two-dimensional code is formed, in a tire radial direction, in a region between a maximum width position of a carcass ply of the pneumatic tire in the tire lateral direction and the rim protection bar.

8. The pneumatic tire according to claim 1, wherein the two-dimensional code includes a dot pattern region where a dot pattern made up of two types of gray scale elements is formed, and a blank region where light elements of the gray scale elements surround the dot pattern region,
   the average thickness of the side rubber in the dot pattern region is greater than the average thickness of the side rubber in the blank region.

9. The pneumatic tire according to claim 8, wherein a position at which the side rubber is thickest among distribution of thickness of the side rubber in the two-dimensional code is located in the dot pattern region.

10. The pneumatic tire according to claim 1, wherein:
    the two-dimensional code is a QR code®; and
    the average thickness of the side rubber in a data cell region displaying data cells of the QR code® is greater than the average thickness of the side rubber in a position detection pattern region displaying a position detection pattern of the QR code®.

11. The pneumatic tire according to claim 10, wherein the position at which the side rubber is thickest among distribution of thickness of the side rubber in the two-dimensional code is located in the data cell region.

12. The pneumatic tire according to claim 1, wherein:
    the pneumatic tire is provided with a rim protection bar that protrudes in a ridge shape around an entire circumference of the sidewall in the tire circumferential direction; and
    the two-dimensional code is formed, in a tire radial direction, in a region between a maximum width position of a carcass ply of the pneumatic tire in the tire lateral direction and the rim protection bar.

13. The pneumatic tire according to claim 1, wherein:
    the side rubber extends toward both directions in tire radial direction with respect to the maximum width position of a carcass ply of the pneumatic tire, and
    the average thickness of the entire side rubber is an average of thicknesses at a plurality of positions that are apart from each other at a certain amount of distance in the tire radial direction.

14. The pneumatic tire according to claim 13, wherein the distance is 3 mm.

15. The pneumatic tire according to claim 1, wherein:
the thickness of the side rubber at the engraving position of the two-dimensional code is 120% or greater than the average thickness of the entire side rubber.

16. The pneumatic tire according to claim 1, wherein:
the engraving position of the two-dimensional code is positioned in an outer side in the tire radial direction with respect to a located position of a bead filler rubber, the bead filler rubber being located in the outer side in the tire radial direction with respect to a bead core of a bead portion which is connected with the sidewall in an opposite side to a side of the tread portion.

17. A pneumatic tire comprising:
a pair of sidewalls provided to sandwich a tread portion from both sides of the tread portion in a tire lateral direction, the tread portion extending in a tire circumferential direction and formed into an annular shape,
one of the pair of sidewalls being engraved with a two-dimensional code on a side rubber surface, the two-dimensional code being formed of a dot pattern made up of two types of gray scale elements distinguishable from each other by irregularities on the surface, and
a side rubber having a thickness at an engraving position of the two-dimensional code from 110 to 150% an average thickness of an entire side rubber, wherein a dot pattern region is formed in a region where radius of curvature of a surface of the sidewall defined by an outermost position, an innermost position and an intermediate position is from 30 to 200 mm, the outermost position being located outermost in the tire radial direction in the dot pattern region formed of a dot pattern made up of two types of gray scale elements in the two-dimensional code, the innermost position being located innermost in the tire radial direction in the dot pattern region, and the intermediate position bisecting a region between the outermost position and the innermost position in the tire radial direction in the dot pattern region.

* * * * *